United States Patent [19]
Mizuhara

[11] Patent Number: 6,098,147
[45] Date of Patent: Aug. 1, 2000

[54] LONGEST COINCIDENCE DATA DETECTION USING ASSOCIATIVE MEMORY UNITS HAVING INTERLEAVED DATA

[75] Inventor: Bun Mizuhara, Tokyo, Japan

[73] Assignee: NEC Corporation, Tokyo, Japan

[21] Appl. No.: 09/097,598

[22] Filed: Jun. 16, 1998

[30] Foreign Application Priority Data

Jun. 19, 1997 [JP] Japan .................................. 9-162714

[51] Int. Cl.[7] .................................................. G06F 12/04
[52] U.S. Cl. ........................................ 711/108; 712/300
[58] Field of Search .................................. 711/108, 300; 365/49

[56] References Cited

U.S. PATENT DOCUMENTS

| | | | |
|---|---|---|---|
| 4,159,538 | 6/1979 | Motsch | 365/49 |
| 5,129,074 | 7/1992 | Kikuchi et al. | 711/173 |
| 5,317,756 | 5/1994 | Komatsu et al. | 712/300 |

FOREIGN PATENT DOCUMENTS 0 380 294  8/1990  European Pat. Off. .

61-162898  7/1986  Japan .

OTHER PUBLICATIONS

Patent Abstracts of Japan, vol. 017, No. 692 (P–1663), Dec. 1993 & JP–05 233211 (Seiko Epson Corp.) Sep. 1993—Abstract.

Anonymous, "Optimizing Use of Shift Register Latch Pair", IBM Technical Disclosure Bulletin, vol. 17, No. 8, pp. 2394–2395—XP002118365, Jan. 1975.

*Primary Examiner*—Jack A. Lane
*Attorney, Agent, or Firm*—Foley & Lardner

[57] ABSTRACT

In a longest coincidence data detecting apparatus, a control section distributes an external data to the N M-bit associative memory units to satisfy a relation of $X_{ij}=Y_{Nj+i}$ where each of N and M is an integer more than 1, $0 \leq i < N$, $0 \leq j < M$, i and j are integers, $X_{ij}$ is a j-th bit of the i-th one of the N associative memory units, and $Y_k$ is a k-th bit of the external data. Each of the N associative memory units compares a distributed portion of the external data and a corresponding portion of an internal data in a designated bit region from a most significant bit of the distributed portion, and outputs a matching signal when the distributed portion of the external data portion and the corresponding portion of the internal data are coincident with each other in the designated bit region.

16 Claims, 3 Drawing Sheets

| EXTERNAL DATA | 0110011100011001 |
| DATA TO CAM2a | 01010010 |
| DATA TO CAM2b | 10110101 |

| CAM2a STORAGE DATA | 01010000 |
| CAM2b STORAGE DATA | 10110000 |
| EXTERNAL EXPRESSION OF STORAGE DATA | 0110011100000000 |

| START | 11111111 |
| SHIFT | 11111110 |
| SHIFT | 11111100 |

START

SHIFT

CAM2b MATCH SIGNAL

CAM2a MATCH SIGNAL

MATCH SIGNAL

COUNTER OUTPUT

D-F/F OUTPUT

MASK BITS

LONGEST COINCIDENCE DATA DETECTION USING ASSOCIATIVE MEMORY UNITS HAVING INTERLEAVED DATA

BACKGROUND OF THE INVENTION

1. Field of the Invention

The present invention relates to a longest coincidence data detection, and more particularly to an apparatus and method for detecting a longest coincidence data between an external data externally supplied and an internal data internally stored.

2. Description of the Related Art

A longest coincidence data detecting apparatus compares an internal data internally stored with an external data externally supplied to detect the longest coincidence data between the internal data and the external data. The longest coincidence data detecting apparatus is conventionally composed of a single associative memory unit or a plurality of associative memory units which are connected in series. The comparison is performed to detect the longest coincidence data while the mask bits for the associative memory units in the whole apparatus are shifted one bit by one bit.

In this manner, in the conventional longest coincidence data detecting apparatus as mentioned above, it is necessary to perform the comparison while the mask bits for the associative memory units in the whole apparatus are shifted over all the bits. Therefore, the shifting operation and the comparing operation must be performed for the number of times which is equal to the number of mask bits. In this manner, there is a problem in that the operation speed becomes slow.

In Japanese Laid Open Patent Disclosure (JP-A-Showa 61-162898), an associative memory apparatus is described which includes a data memory, a counter for counting an address of the data memory, and a mechanism for comparing a search data and an output of the data memory and for stopping the counter when the comparing result indicates matching. In this reference, the associative memory apparatus is composed of a search data memory for storing a plurality of search data, a selecting means for selecting a specific one of the plurality of search data stored in the search data memory, the mechanism for comparing a portion of the selected search data in a specific comparison region and a portion of a data read out from the data memory corresponding to the comparison region for the selected search data, and for stopping the counter when the comparing result indicates coincidence, and another mechanism for restarting the counter from an address next to the stopped address.

SUMMARY OF THE INVENTION

The present invention is accomplished in view of the above problems in the conventional technique. Therefore, an object of the present invention is to provide an apparatus and method for detecting a longest coincidence data, in which a longest coincidence data can be detected at high speed.

In order to achieve an aspect of the present invention, a longest coincidence data detecting apparatus includes N M-bit associative memory units, wherein each of N and M is an integer more than one, and a control section for distributing an external data to the N associative memory units to satisfy a relation of $$X_{ij}=Y_{Nj+i}$$

where $0 \leq i < N$, $0 \leq j < M$, i and j are integers, $X_{ij}$ is a j-th bit of the i-th one of the N associative memory units, and $Y_k$ is a k-th bit of the external data. Here, each of the N associative memory units compares a distributed portion of the external data and a corresponding portion of an internal data in a designated bit region from a most significant bit of the distributed portion, and outputs a matching signal when the distributed portion of the external data portion and the corresponding portion of the internal data are coincident with each other in the designated bit region. The longest coincidence data detecting apparatus further includes a coincidence determination unit for generating a matching signal indicative of coincidence between the external data and the internal data in the designated bit region when the matching signals are received from the N associative memory units.

When the designated bit region is designated based on a mask bit data, the control section supplies to the N associative memory units, the mask bit data which indicates the designated bit region narrowed by one bit from a least significant bit of the distributed portion of the external data each time a shift signal is inputted. In this case, all bits of an initial data of the mask bit data is "1", and each bit of the initial data of the mask bit data is changed to "0" from a least significant bit each time the shift signal is inputted, and the designated bit region is designated based on the bits of "1" of the mask bit data. Also, the longest coincidence data detecting apparatus may further include a bit count outputting section for outputting a data indicative of a number of bits for which the external data and the internal data are not coincident with each other from a least significant bit of the external data, from a number of times of the input of the shift signal and the matching signals from the N associative memory units.

The longest coincidence data detecting apparatus may further include a bit count outputting section for outputting a data indicative of a number of bits for which the external data and the internal data are not coincident with each other from a least significant bit of the external data, from the designated bit region. In this case, when the N associative memory units comprises first and second associative memory units, the bit count outputting section includes a counter for counting a number of times of input of a shift signal to produce a count data, the shift signal being used to determine the designated bit region, a flip-flop for outputting an output state data indicative of whether the matching signal is already outputted from the first associative memory unit, and a subtracting unit for subtracting the output state data from a data derived from the count data to output a matching bit count data indicative of the number of bits for which the external data and the internal data are coincident with each other from the least significant bit.

In order to achieve another aspect of the present invention, a method of detecting a longest coincidence data, comprising the steps of:

distributing an external data to N M-bit associative memory units to satisfy a relation of $$X_{ij}=Y_{Nj+i}$$

where each of N and M is an integer more than one, $0 \leq i < N$, $0 \leq j < M$, i and j are integers, $X_{ij}$ is a j-th bit of the i-th one of the N associative memory units, and $Y_k$ is a k-th bit of the external data;

comparing a distributed portion of the external data and a corresponding portion of an internal data in a designated bit region from a most significant bit of the distributed portion;

generating a matching signal from each of the N associative memory units when the distributed portion of the external data portion and the corresponding portion of the internal data are coincident with each other in the designated bit region; and a coincidence determination unit for generating a matching signal indicative of coincidence between the external data and the internal data in the designated bit region when the matching signals are received from the N associative memory units.

In order to achieve still another aspect of the present invention, a longest coincidence data detecting apparatus includes a plurality of associative memory units, each of which compares a portion of an external data and a corresponding portion of an internal data in accordance with a mask bit data, and outputs a matching signal when the external data portion and the corresponding portion of the internal data are coincident with each other in the region designated by the mask bit data, a control section for respectively supplying the portions of the external data to the plurality of associative memory units in response to a start signal, for shifting a designation data by one bit from a least significant bit to produce a shifted designation data each time a shift signal is inputted, and for outputting, as the mask bit data to all of the plurality of associative memory units, the designation data when no sift signal is inputted, and the shifted designation data when the shift signal is inputted, and a coincidence determination unit for generating a matching signal indicative of coincidence between the external data and the internal data in portion when the matching signals are received from the plurality of associative memory units.

DESCRIPTION OF THE PREFERRED EMBODIMENTS

Next, the longest coincidence data detecting apparatus of the present invention will be described with reference to the attached drawings.

Figure 1:
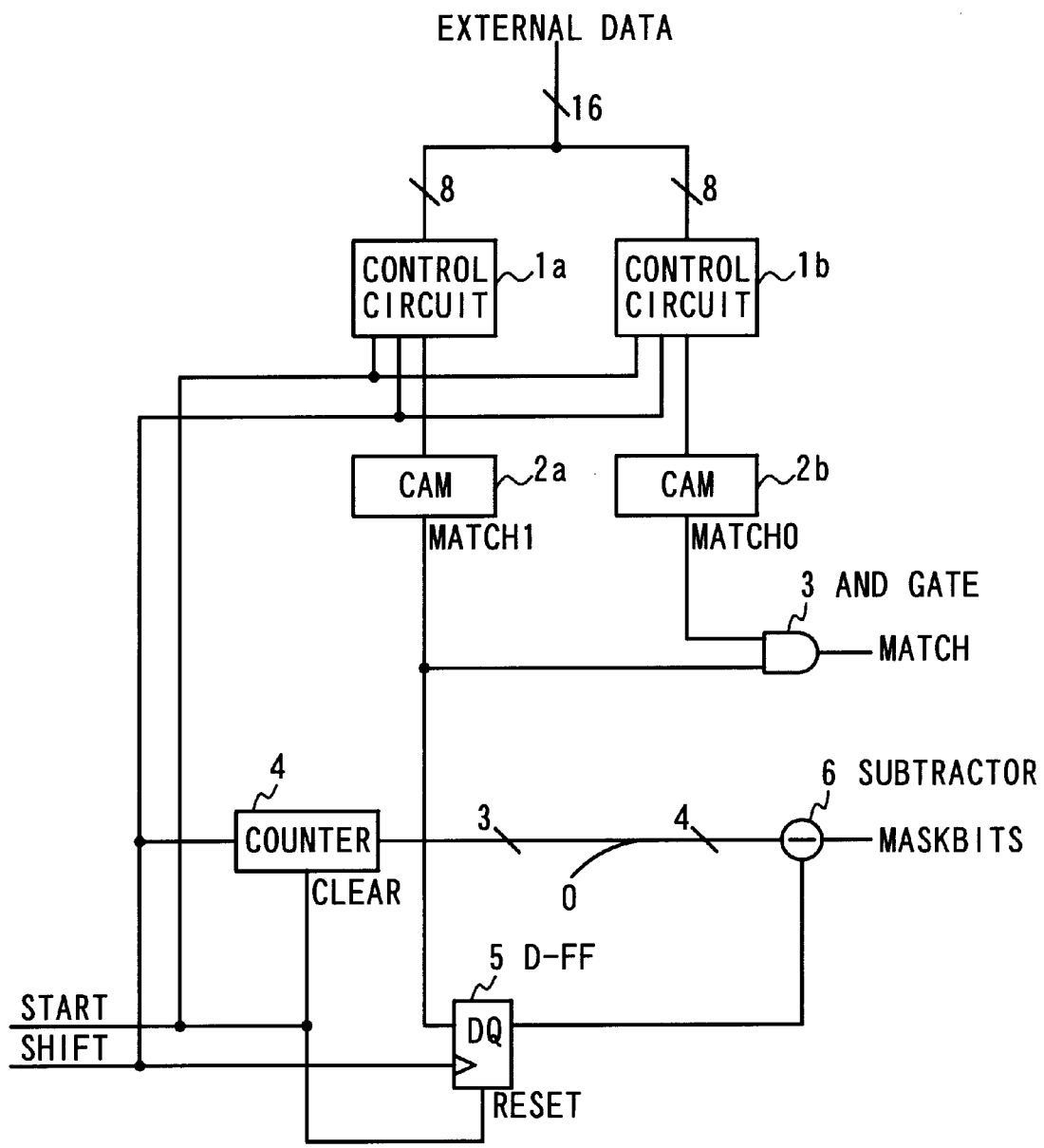
FIG. 1 is a circuit block diagram illustrating the longest coincidence data detecting apparatus according to an embodiment of the present invention.

FIG. 1 is a circuit block diagram illustrating the structure of the longest coincidence data detecting apparatus according to an embodiment of the present invention. In this embodiment, two associative memory units are provided.

As shown in FIG. 1, the longest coincidence data detecting apparatus in the embodiment is composed of control circuits 1a and 1b, associative memory units (CAMs) 2a and 2b, an AND gate 3, a counter 4, a D-type flip-flop (DQ) 5, and a subtracting unit 6.

The control circuits 1a and 1b receive two 8 bits of a 16-bit external data and the two 8 bits to the associative memory units 2a and 2b in response to a START signal, respectively. Also, the control circuits 1a and 1b each have mask bit data and shifts the mask bit data one bit by one bit from the least significant bit to the most significant bit in response to a SHIFT signal. The shifted mask bit data are supplied to the associative memory units 2a and 2b, respectively. In this manner, the same mask bit data is supplied to the associative memory units 2a and 2b.

Each of the associative memory units 2a and 2b receives a portion of the external data outputted from a corresponding one of the control circuits 1a and 1b. Then, the associative memory unit compares the received portion of the external data and the portion of an internal data stored therein based on the mask bit data supplied from the control circuit. The associative memory unit 2a or 2b outputs a matching signal MATCH1 and MATCH0, when the received portion of the external data and the portion of the internal data are coincident with or match to each other.

The AND gate 3 calculates a logic product of the matching signals outputted from the associative memory units 2a and 2b to output the calculation result as a MATCH signal. That is, the AND gate 3 outputs the MATCH signal indicating that the external data and the internal data are coincident with in a region designated by the mask bit data.

The counter 4 is reset in response to the START signal and counts the number of times of input of the SHIFT signal. The D-type flip-flop 5 is reset in response to the START signal. The D-type flip-flop 5 receives the SHIFT signal as a clock signal, and outputs the MATCH1 signal supplied from the associative memory unit 2a in response to the clock signal. The subtracting unit 6 subtracts the data which is outputted from the D-type flip-flop 5 from a data corresponding to the count value supplied from the counter 4 to output the subtracting result as a MASKBITS signal.

Next, the operation of the longest coincidence data detecting apparatus according to the embodiment of the present invention will be explained.

Figures 2, 3, 4, 5:
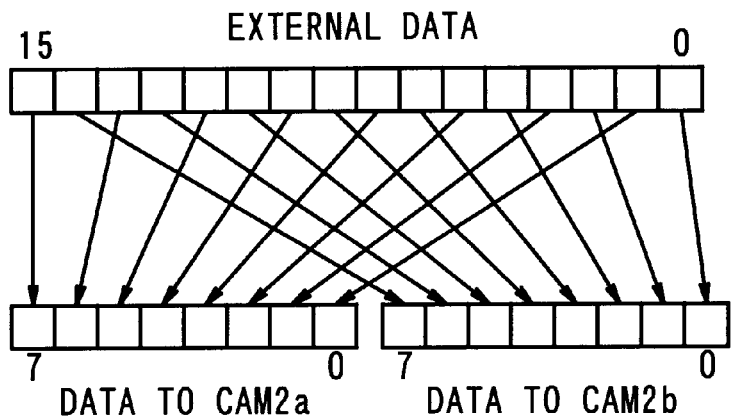
FIG. 2 is a diagram illustrating the distribution of an external data to associative memory units in the longest coincidence data detecting apparatus according to the embodiment of the present invention.
FIG. 3 is a diagram illustrating an example of the external data and distribution of the external data in the longest coincidence data detecting apparatus according to the embodiment of the present invention.
FIG. 4 is a diagram illustrating an example of the internal data and the external expression of the internal data in the longest coincidence data detecting apparatus according to the embodiment of the present invention.
FIG. 5 is a diagram illustrating the changing state of a mask bit data in the longest coincidence data detecting apparatus according to the embodiment of the present invention.

FIG. 2 It is a diagram illustrating the distribution of an external data to associative memory units in the longest coincidence data detecting apparatus according to the embodiment of the present invention. FIG. 3 is a diagram illustrating an example of the external data and distribution of the external data in the longest coincidence data detecting apparatus according to the embodiment of the present invention. FIG. 4 is a diagram illustrating an example of the internal data and the external expression of the internal data in the longest coincidence data detecting apparatus according to the embodiment of the present invention. FIG. 5 is a diagram illustrating the changing state of a mask bit data in the longest coincidence data detecting apparatus according to the embodiment of the present invention. FIGS. 6A to 6H are timing charts to describe the operation of the longest coincidence data detecting apparatus according to the embodiment of the present invention.

As shown in FIG. 2, two 8-bit data of the 16-bit external data shown in FIG. 3 are supplied to the control circuits 1a and 1b, respectively. Now, it is assumed that $Y_k$ is the k-th bit of the external data. Also, it is assumed that $X_{0j}$ is the j-th bit of the first 8-bit data which is inputted to the control circuit 1a, and $X_{1j}$ is the j-th bit of the second 8-bit data which is inputted to the control circuit 1b. In this case, the relation $$X_{ij}=Y_{2j+i} \ (0 \leq i<2, \ 0 \leq j<8)$$

is satisfied. Therefore, the first bit data of "01010010" and the second bit data of "10110101" are held in the control circuits 1a and 1b.

Figure 6A:
FIGS. 6A to 6H are timing charts to describe the operation of the longest coincidence data detecting apparatus according to the embodiment of the present invention.

The two 8-bit data are supplied from the control circuits 1a and 1b to the associative memory units 2a and 2b in response to the START signal, respectively, as shown in FIG. 6A. Also, a mask bit data is set to "11111111" in response to the START signal, as shown in FIG. 5. Then, the same mask bit data is also supplied from the control circuits 1a and 1b to the associative memory units, respectively in response to the START signal.

The data bit of the mask bit data corresponding to "1" indicates that the comparison between the external data and the internal data should be performed in a bit position corresponding to the mask bit of "1". On the other hand, the data bit of the mask bit corresponding to "0" indicates that the comparison between the external data and the internal data should not be performed in a bit position corresponding to the mask bit of "0". For instance, in the embodiment, the mask bit data of "11111111" mean that all the bits of the 8-bit external data portion are compared with all the bits of the 8-bit internal data portion. On the other hand, the mask bit data of "11111110" mean that all the bits of the 8-bit external data portion other than the least significant bit are compared with all the bits of the 8-bit internal data portion other than the least significant bit.

Further, when the START signal is externally inputted, the counter 4 and the D-type flip-flop 5 are cleared to 0.

In the associative memory unit 2a, all the bits of the 8-bit external data portion of "01010010" shown in FIG. 3 are respectively compared with all the bits of the 8-bit internal data portion of "01010000" shown in FIG. 4. This is because the mask bit data is set to "11111111" in this case. Also, in the associative memory unit 2b, all the bits of the 8-bit external data portion of "10110101" shown in FIG. 3 are respectively compared with all the bits of the 8-bit internal data portion of "10110000" shown in FIG. 4. This is also because the mask bit data is set to "11111111" in this case. It should be noted that the external expression of the internal data is "0110 0111 0000 0000" shown in FIG. 4. At this time, the external data and the stored data are not coincident with each other in the associative memory units 2a and 2b. Therefore, the matching signals MATCH0 and MATCH1 are both "0". As a result of that, the MATCH signal which is the logic product of them also becomes "0".

Figure 6B:

Next, when a SHIFT signal of "1" is supplied to the control circuits 1a and 1b and the counter 4 and the D-type flip-flop, as shown in FIG. 6B. The mask bit data are shifted by one bit into the direction of the most significant bit in the control circuits 1a and 1b and "0" is added to the shifted mask bit data in the least significant bit. As a result, a new mask bit data is set to "11111110". Thus, the comparison bit region can be designated by the mask bit data.

Figure 6C:
Figure 6D:
Figure 6E:
Figure 6F:
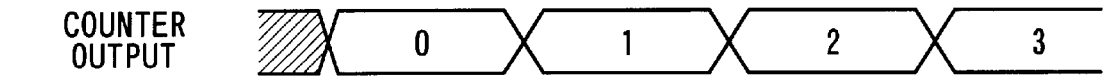

This mask bit data is supplied to the associative memory units 2a and 2b, and the comparison is performed so as to ignore the least significant bit. At the same time, the counter 4 is counted up by "1" so that "1" is output from the counter 4, as shown in FIG. 6F. At this state, either of the MATCH0 signal or the MATCH1 signal is "0" as shown in FIGS. 6C and 6D and therefore the MATCH signal is still "0" as shown in FIG. 6E.

Next, when the SHIFT signal becomes "1" again, the mask bit data for the associative memory units 2a and 2b are set to "11111100", as shown in FIG. 5. As a result, the comparison is performed while the lower 2 bits are ignored.

Figure 6G:

At the same time, since the external data portion is coincident with or matches to the internal data portion in the associative memory unit 2a, the MATCH1 signal of "1" is outputted from the associative memory unit 2a. On the other hand, since the coincidence is not yet accomplished in the associative memory unit 2b, the MATCH0 signal of "0" is outputted from the associative memory unit 2b to the AND gate 3 and the D-type flip-flop 5, as shown in FIG. 6G. Also, the counter 4 is counted up to output "2", as shown in FIG. 6F. In this case, because the MATCH0 signal is "0", the MATCH signal is also "0". However, the MATCH1 signal of "1" is supplied to the D-type flip-flop 5.

Next, when the SHIFT signal becomes "1" again, the mask bit data of the control circuits 1a and 1b are set to "11111000", as described above. As a result, the comparison is performed while the lower 3 bits are ignored.

At the same time, the counter 4 is counted up by "1" to output "3", as shown in FIG. 6F. Also, since the external data portion and the internal data portion are coincident with each other in the associative memory units 2b when the lower 3 bits are ignored, the MATCH0 signal is set to "1" as shown in FIG. 6C. As a result, the logical product of the MATCH0 signal and the MATCH1 signal is set to "1" as the MATCH signal as shown in FIG. 6E.

In this case, since the MATCH1 signal is already set to "1", the output of the flip-flop 5 is set to "1" in response to the SHIFT signal, as shown in FIG. 6E. The output of "3" from the counter 4 is supplied to the subtracting unit 6. At this time, "0" is applied to the binary expression of the count value of the counter 4 as the least significant bit, i.e., "110" is obtained. Therefore, the subtracting unit 6 subtracts the data of "1" supplied from the D-type flip-flop 5 from the binary expression of "110". As a result of "101", that is "5" is obtained. This value is outputted as the MASKBITS signal.

Figure 6H:
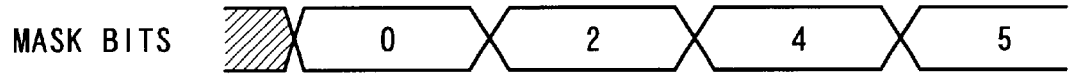

In the above-mentioned state, the output of the counter 4 is "3". Therefore, the least significant bit of "0" is added to the binary expression of the output of the counter 4, so that the output of the counter 4 is set to "6", i.e., "110". At this time, because the output of the D-type flip-flop 5 is "1", the MASKBITS signal is set to "5" as shown in FIG. 6H. This means that the lower 5 bits from the least significant bit must be ignored to make the external data and the external expression of the internal data portions to be coincident with each other.

In this manner, a circuit section composed of the counter 4, the flip-flop 5 and the subtracting unit 6 functions to detect the number of bits of the non-coincident portion between the external data and the internal data. In this case, the circuit section may output the number of bit of coincident portion between the external data and the internal data.

As described above, according to the present invention, an external data of L bits and an internal data of L bits are compared to detect the longest coincidence data between the external data and the internal data. In this case, n m-bit associative memory units are provided to satisfy a relation of $$X_{ij}=Y_{Nj+i}$$

where $0 \leq i <N$, $0 \leq j<M$, the data, $X_{ij}$ is a data given to the bit j of the i-th associative memory means, and $Y_k$ is the k-th bit of the external data. Therefore, it is sufficient to perform the shifting operation and comparing operation m times for detection of a longest coincidence data of L bits. In this manner, the longest coincidence data detection can be performed at higher speed, compared with a conventional example in which it is necessary to perform the shifting operation and comparing operation L times at maximum.

Also, there are provided a counter for counting a SHIFT signal externally inputted, a flip-flop for outputting a signal outputted from associative memory means using the SHIFT signal as a clock signal, and a subtracting unit for subtracting and outputting a signal outputted from the flip-flop from the count value by the counter. In this case, in order to make the external data and the external expression of the stored data to be coincident with each other, it is indicated the external data and the stored data must be compared by ignoring how many bits from the least significant bit.

What is claimed is:

1. A longest coincidence data detecting apparatus comprising:

N M-bit associative memory units, wherein each of N and M is an integer more than one;

a control section for distributing an external data to said N associative memory units to satisfy a relation of $X_{ij}=Y_{Nj+i}$ where $0 \leq i < N$, $0 \leq j < M$, i and j are integers, $X_{ij}$ is a j-th bit of said i-th one of said N associative memory units, and $Y_k$ is a k-th bit of said external data;

wherein each of said N associative memory units compares a distributed portion of said external data and a corresponding portion of a storage data in a designated bit region from a most significant bit of the distributed portion, and outputs a matching signal when the distributed portion of said external data portion and the corresponding portion of said storage data are coincident with each other in the designated bit region; and a coincidence determination unit for generating a coincidence signal indicative of coincidence between said external data and said storage data in the designated bit region when said matching signals are received from said N associative memory units.

2. A longest coincidence data detecting apparatus according to claim 1, wherein the designated bit region is designated based on a mask bit data, and wherein said control section supplies to said N associative memory units, said mask bit data which indicates the designated bit region narrowed by one bit from a least significant bit of the distributed portion of said external data each time a shift signal is inputted.

3. A longest coincidence data detecting apparatus according to claim 2, wherein all bits of an initial data of said mask bit data is "1", and each bit of the initial data of said mask bit data is changed to "0" from a least significant bit each time the shift signal is inputted, and the designated bit region is designated based on the bits of "1" of said mask bit data.

4. A longest coincidence data detecting apparatus according to claim 2, further comprising a bit count outputting section for outputting a data indicative of a number of bits for which said external data and said storage data are not coincident with each other from a least significant bit of said external data, from a number of times of the input of said shift signal and the matching signals from said N associative memory units.

5. A longest coincidence data detecting apparatus according to claim 1, further comprising a bit count outputting section for outputting a data indicative of a number of bits for which said external data and said storage data are not coincident with each other from a least significant bit of said external data, from the designated bit region.

6. A longest coincidence data detecting apparatus according to claim 5, wherein said N associative memory units comprises first and second associative memory units, and wherein said bit count outputting section comprises:

a counter for counting a number of times of input of a shift signal to produce a count data, the shift signal being used to determine the designated bit region;

a flip-flop for outputting an output state data indicative of whether said matching signal is already outputted from said first associative memory unit; and a subtracting unit for subtracting the output state data from a data derived from the count data to output a matching bit count data indicative of the number of bits for which said external data and said storage data are coincident with each other from the least significant bit.

7. A method of detecting a longest coincidence data, comprising the steps of:

distributing an external data to N M-bit associative memory units to satisfy a relation of $$X_{ij}=Y_{Nj+i}$$

where each of N and M is an integer more than one, $0 \leq i < N$, $0 \leq j < M$, i and j are integers, $X_{ij}$ is a j-th bit of said i-th one of said N associative memory units, and $Y_k$ is a k-th bit of said external data;

comparing a distributed portion of said external data and a corresponding portion of a storage data in a designated bit region from a most significant bit of the distributed portion;

generating a matching signal from each of said N associative memory units when the distributed portion of said external data portion and the corresponding portion of said storage data are coincident with each other in the designated bit region; and a coincidence determination unit for generating a coincidence signal indicative of coincidence between said external data and said storage data in the designated bit region when said matching signals are received from said N associative memory units.

8. A method according to claim 7, further comprising the step of designating the designated bit region in response to a shift signal to produce a mask bit data.

9. A method according to claim 8, wherein said designating step includes changing each bit of an initial data of a mask bit data from "1" to "0" from a least significant bit each time the shift signal is inputted, wherein all bits of the initial data of said mask bit data is "1", and the designated bit region is designated based on the bits of "1" of said mask bit data.

10. A method according to claim 9, further comprising the step of generating a data indicative of a number of bits for which said external data and said storage data are not coincident with each other from a least significant bit of said external data, from a number of times of the input of said shift signal and the matching signals from said N associative memory units.

11. A method according to claim 8, further comprising the step of generating a data indicative of a number of bits for which said external data and said storage data are not coincident with each other from a least significant bit of said external data, from the designated bit region.

12. A method according to claim 11, wherein said step of generating a data indicative of a number of bits includes:

counting a number of times of input of a shift signal to produce a count data, the shift signal being used to determine the designated bit region;

generating an output state data indicative of whether said matching signal is already outputted from said first associative memory unit; and subtracting the output state data from a data derived from the count data to output a matching bit count data indicative of the number of bits for which said external data and said storage data are coincident with each other from the least significant bit.

13. A longest coincidence data detecting apparatus comprising:

a plurality of associative memory units, each of which compares a portion of an external data and a corresponding portion of a storage data in accordance with a mask bit data, and outputs a matching signal when said external data portion and the corresponding portion of said storage data are coincident with each other in the region designated by said mask bit data;

a control section for respectively supplying said portions of said external data to said plurality of associative memory units in response to a start signal, for shifting a designation data by one bit from a least significant bit to produce a shifted designation data each time a shift signal is inputted, and for outputting, as said mask bit data to all of said plurality of associative memory units, said designation data when no sift signal is inputted, and said shifted designation data when said shift signal is inputted; and a coincidence determination unit for generating a coincidence signal indicative of coincidence between said external data and said storage data in portion when said matching signals are received from said plurality of associative memory units.

14. A longest coincidence data detecting apparatus according to claim 13, wherein a number of said plurality of associative memory units is N and each of said plurality of associative memory units has an M-bit width, each of N and M being an integer more than one, and wherein said control section distributes said external data to said plurality of associative memory units to satisfy a relation of $$X_{ij} = Y_{Nj+i}$$

where $0 \leq i < N$, $0 \leq j < M$, i and j are integers, the data, $X_{ij}$ is a j-th bit of said i-th one of said plurality of associative memory units, and $Y_k$ is a k-th bit of said external data.

15. A longest coincidence data detecting apparatus according to claim 13, further comprising a bit count outputting section for outputting a data indicative of a number of bits coincident with each other between said external data and said storage data from said shift signal and said matching signal from each of said plurality of associative memory units.

16. A longest coincidence data detecting apparatus according to claim 15, wherein said plurality of associative memory units comprises first and second associative memory units, and wherein said bit count outputting section comprises:

a first counter for counting a number of times of the input of said shift signal to produce a count data;

a flip-flop for outputting an output state data indicative of whether said matching signal is already outputted from said first associative memory unit; and a subtracting unit for subtracting the output state data from a data derived from the count data to output a matching bit count data indicative of the number of bits coincident with each other between said external data and said storage data.

* * * * *